(12) United States Patent
McDaid

(10) Patent No.: US 12,464,238 B2
(45) Date of Patent: Nov. 4, 2025

(54) FOCAL ADJUSTMENT OF AN AUTOMOTIVE CAMERA FOR DIFFERENT REGIONS OF INTEREST

(71) Applicant: CONNAUGHT ELECTRONICS Ltd., Tuam (IE)

(72) Inventor: Patrick McDaid, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 0 days.

(21) Appl. No.: 18/536,728

(22) Filed: Dec. 12, 2023

(65) Prior Publication Data

US 2024/0205542 A1 Jun. 20, 2024

(30) Foreign Application Priority Data

Dec. 14, 2022 (DE) .......................... 102022133188.1

(51) Int. Cl.
| | |
|---|---|
| *H04N 23/67* | (2023.01) |
| *B60W 60/00* | (2020.01) |
| *H04N 25/50* | (2023.01) |

(52) U.S. Cl.
CPC .......... *H04N 23/675* (2023.01); *H04N 25/50* (2023.01); *B60W 60/001* (2020.02)

(58) Field of Classification Search
CPC ...... H04N 23/65; H04N 25/50; H04N 23/675; H04N 23/54; H04N 23/67; H04N 23/70; H04N 23/57; H04N 25/531; H04N 25/532; B60W 60/001; B60R 1/22; B60R 11/04

See application file for complete search history.

(56) References Cited

U.S. PATENT DOCUMENTS

| | | | |
|---|---|---|---|
| 2015/0296123 A1* | 10/2015 | Blayvas .............. | H04N 23/673 348/345 |
| 2019/0124238 A1* | 4/2019 | Byrne ................ | H04N 23/52 |
| 2021/0364319 A1 | 11/2021 | Abramson | |
| 2023/0127668 A1 | 4/2023 | Sakurabu et al. | |

FOREIGN PATENT DOCUMENTS

| | | |
|---|---|---|
| DE | 102016124089 A1 | 6/2018 |
| WO | 2007/057498 A1 | 5/2007 |
| WO | 2022004302 A1 | 1/2022 |

OTHER PUBLICATIONS

International Search Report issued in corresponding German Patent Application No. DE 10 2022 133 188.1 mailed Jul. 12, 2023 (5 pages).
European Search Report issued in corresponding EP Application No. 23214593.8, mailed on Apr. 17, 2024 (9 pages).

\* cited by examiner

*Primary Examiner* — Michael E Teitelbaum
(74) *Attorney, Agent, or Firm* — Osha Bergman Watanabe & Burton LLP

(57) ABSTRACT

A method for focal adjustment of an automotive camera is disclosed. The method includes providing a target focal setting for the camera for predefined regions of interest, determining a first and second focal setting for each subset of regions of interest depending on the respective target focal settings of the regions, capturing a first and second image during the first frame period respectively. The first and second focal settings are used during at least part of the first and second frame periods respectively. Between the capturing of the first and second images, the first focal setting is changed to the second focal setting.

12 Claims, 8 Drawing Sheets

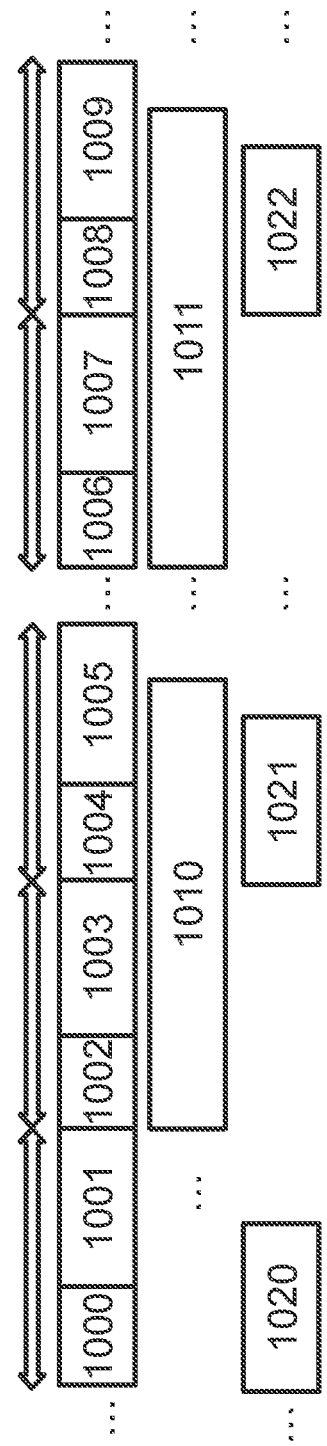

FOCAL ADJUSTMENT OF AN AUTOMOTIVE CAMERA FOR DIFFERENT REGIONS OF INTEREST

The present invention is directed to a method for a focal adjustment of an automotive camera, to a method for guiding a vehicle at least in part automatically, to an automotive camera comprising an imager, a focal adjustment arrangement and at least one control unit, to an electronic vehicle guidance system and to a computer program product.

In photography or other applications of cameras, the term focusing refers to the adjustment of respective camera settings and/or lens settings to the object distance so that the object to be depicted or a certain part of the environment to be depicted is in focus. This kind of adjustment is also denoted as focus adjustment or focal adjustment in the following.

In the context of automotive applications of cameras, image streams or video streams comprising a plurality of consecutive camera images according to consecutive frames may be captured and displayed and/or processed to realize various driver assistant functions or other functions for guiding a vehicle at least in part automatically. The corresponding frame rate may, for example, lie in the order of several frames or several tens of frames per second. Typically frame rates between 15 fps and 60 fps may be used.

In automotive applications, different focal settings of the camera may be optimal for different cases. For example, for different functions objects at different distances from the camera may be typically relevant. For example, for a driver assistance function assisting the driver of a vehicle at backwards driving, for example for parking the vehicle, close lying objects may be most relevant, whereas for computer vision algorithms detecting other vehicles, pedestrians or further traffic users in the environment, the most relevant objects may be typically located farther away from the camera.

In other words, there may be different regions of interest, ROIs, in the field of view of the camera, which are relevant for different functions, and different focal settings may be optimal for the various ROIs. Consequently, the focal settings may be chosen such that a compromise for all involved ROIs is found. However, this may impair the performance of the subsequent functions making use of the images.

Document DE 10 2016 124 089 A1 describes the use a camera in a rolling shutter mode in a motor vehicle.

It is an objective of the present invention to provide an improved concept for focal adjustment of an automotive camera, in which the individual requirements of different ROIs can be better met, in particular a reduced degree of compromise has to be made with respect to optimal focal settings for the individual ROIs, which are also denoted as target focal settings in the following.

This objective is achieved by the respective subject-matter of the independent claims. Further implementations and preferred embodiments are subject-matter of the dependent claims.

The invention is based on the idea to use a first focal setting determined for a first subset of the involved ROIs in order to capture a first image in a first frame period and a different second focal setting for a second subset of the involved ROIs in a subsequent second frame period for capturing a second image.

According to an aspect of the invention, a method for focal adjustment of an automotive camera is provided. Therein, for each of two or more predefined regions of interest, ROIs, within a field of view of the camera, a corresponding target focal setting for the camera is provided, in particular to at least one control unit of the camera. A first focal setting is determined for a first subset of the two or more predefined ROIs depending on the respective target focal settings of the ROIs of the first subset of ROIs, in particular by the at least one control unit. A first image is captured during a first frame period by an imager of the camera, wherein the first focal setting is used at least during a part of the first frame period. A second focal setting is determined, in particular by the at least one control unit, for a second subset of the two or more predefined ROIs depending on the respective target focal settings of the ROIs of the second subset of ROIs. The first focal setting is changed to the second focal setting, in particular by a focal adjustment arrangement, which may to this end, for example, be controlled by the at least one control unit. A second image is captured during the second frame period after the first frame period by the imager, wherein the second focal setting is used at least during a part of the second frame period.

For changing the focal setting of the camera from the first focal setting to the second focal setting, at least one focal parameter of the camera is adjusted accordingly, in particular by means of the focal adjustment arrangement. In particular, the adjustment of the at least one focal parameter is carried out during a focal adjustment period, which begins when or after the part of the first frame period, during which the first focal setting is used, ends and ends before the part of the second frame period, during which the second focal setting is used, begins.

Consequently, the method for focal adjustment according to the invention can also be denoted as a method for capturing at least the first and the second image, wherein a focal adjustment for capturing the second image is carried out.

In particular, the ROIs of the first subset of ROIs are depicted or mapped by the camera to the sensor array of the imager during the part of the first frame period, during which the first focal setting is used. However, it is not excluded that the first focal setting is used during a further part of the first frame period, during which regions in the field of view are depicted or mapped by the camera to the sensor array, which do not belong or lie within any of the ROIs of the first subset of ROIs.

Analogously, the ROIs of the second subset of ROIs are depicted or mapped by the camera to the sensor array of the imager during the part of the second frame period, during which the second focal setting is used. However, it is not excluded that the second focal setting is used during a further part of the second frame period, during which regions in the field of view are depicted or mapped by the camera to the sensor array, which do not belong or lie within any of the ROIs of the second subset of ROIs.

An automotive camera may be considered as a camera suitable for being mounted to a vehicle, in particular a motor vehicle, such as a front camera, a rear camera, a side camera, et cetera. While the method according to the invention is carried out, the automotive camera is mounted to the vehicle.

The first frame period and the second frame period may, for example, correspond to two consecutive frames of an image stream or video stream generated by the camera. Consequently, the second frame period may begin immediately when the first frame period has ended. However, the exposure of the whole sensor array may be completed, and/or data read out and, for example data storage, may be completed for the first image already before the first frame period ends.

Here and in the following an ROI, in particular an ROI of the two or more predefined ROIs, may be considered as a three-dimensional volume in the environment of the camera, also denoted as real world, for example a cubic volume or a volume of cuboid shape or another three-dimensional volume. The points in the three-dimensional volume are then mapped in a predefined manner, which is, in particular, given by the intrinsic parameters of the camera, to the two-dimensional surface of the sensor array. The sensor pixels on the sensor array to which the ROI is mapped, then correspond to a certain area on the sensor array. In particular, the ROI is a connected three-dimensional volume, and a corresponding mapped area is a connected portion on the surface of the sensor array. For example, all ROIs of the two or more predefined ROIs may be different from each other, which does, however, not exclude overlapping ROIs.

The imager may be understood as an electronic device comprising the sensor array, which corresponds to an array of optical detectors. A sensor pixel may be understood as one of the optical detectors or a group of two or more adjacent of the optical detectors. The sensor array may be designed as a CCD sensor, a CMOS sensor, in particular an active pixel sensor or a passive pixel sensor, or another sensor array, which is sensitive to light, in particular visible light. The imager may also comprise further electronic components in addition to the sensor array, for example, for reading out the sensor array and/or preprocessing purposes et cetera. The imager may be implemented on a single semi-conductive chip and may therefore also be denoted as imager chip. Alternatively, the sensor array and the further electronic components may be implemented on two or more different semi-conductive chips, which may, for example, be mounted on a common circuit board. In particular, the imager may comprise one or more of the at least one control unit of the camera.

The at least one focal parameter depends on how the focal adjustment is actually carried out. For example, if the focal adjustment is carried out by adjusting a distance between the sensor array and a lens unit of the camera, the at least one focal parameter may comprise or consist of the distance between the sensor array and the lens unit. The at least one focal parameter may also comprise at least one control parameter for operating the focal adjustment arrangement or may comprise relative distance changes between the sensor array and the lens unit et cetera. The at least one focal parameter may also comprise a focal length of the lens unit in case the focal length may be changed in order to carry out the focal adjustment. Also relative differences in the focal length may represent the at least one focal parameter. In general, the at least one focal parameter comprises one or more parameters, which directly or indirectly affect or change the distance between the image plane of the camera, which is given by a plane comprising the surface of the sensor array to an object-side principal plane of the lens unit.

The predefined first focal setting and second focal setting correspond to respective sets of values for the at least one focal parameter. It may be focal settings for capturing the whole first or second image, respectively, or for capturing a part of the first or second image, respectively. In particular, the first focal setting is different from the second focal setting.

The first subset of ROIs, which comprises one or more of the two or more ROIs, is a real subset of the two or more ROIs. In other words, the first subset of ROIs does not contain all of the two or more ROIs. The same holds for the second subset of ROIs. The first subset of ROIs is different from the second subset of ROIs. However, the first and the second subset of ROIs may overlap. In other words, the first subset of ROIs may contain one or more ROIs, which are also contained by the second subset of ROIs.

The target focal settings for the two or more ROIs are provided, in particular to the at least one control unit, in a computer-readable manner, for example stored on a storage device of the camera.

The target focal setting for a given ROI may, for example, be understood as an optimal focal setting according to certain specific requirements of a subsequent function. It is out of the scope of the present invention, how these target focal settings are determined. The first focal setting may be identical to one of the target focal settings of the two or more ROIs or may be different from all of them. The same holds analogously for the second focal setting.

According to the invention, two different focal settings are used during two different frame periods. Therefore, the individual requirements regarding the focal settings for different ROIs in the field of view may better met, and less compromises are necessary to address the different ROIs. It becomes therefore possible, for example, to provide suitable input data for different vehicle functions, for example, human vision functions (HV-functions) and/or computer vision functions (CV-functions), which make use of different ROIs associated to different optimal target focal settings.

According to several implementations of the method, the target focal settings are identical for all ROIs of the first subset. In this case, the first focal setting is also identical to the target focal settings of the ROIs of the first subset of the ROIs.

In some of these implementations, the first subset of ROIs contains exactly one of the two or more ROIs. In other implementations, the first subset of ROIs contains at least two of the two or more ROIs, which all share the first focal setting as respective target focal setting.

According to several implementations, the target focal settings are identical for all ROIs of the second subset of ROIs and are identical to the second focal settings.

In some of these implementations, the second subset of ROIs contains exactly one of the two or more ROIs. In other implementations, the second subset of ROIs contains at least two of the two or more ROIs, which all share the second focal setting as respective target focal setting.

According to several implementations, the target focal settings of the first subset of ROIs contain at least two different target focal settings. The first focal setting is computed, in particular by the at least one control unit, by interpolating between the at least two different target focal settings of the first subset of ROIs or by averaging the at least two different target focal settings of the first subset of ROIs.

In such implementations, a certain degree of compromise is accepted, which results from the interpolation or averaging. However, since the interpolation or averaging is not carried out for all of the target focal settings of all of the two or more ROIs but only for those of the first subset of ROIs, the overall level of compromise is reduced. In particular, the first subset of ROIs may be chosen such that the respective target focal settings are similar to each other, to reduce the negative effects of averaging or interpolation.

In such implementations, the number of ROIs contained by the first subset of ROIs is equal to or greater than two. Consequently, the total number of the two or more ROIs is at least three.

It is noted that different types of averaging can be involved in said implementations, including the computation of an arithmetic mean, a harmonic mean, a root mean square, et cetera. Furthermore, the quantities to be averaged may also be weighted.

According to several implementations, the target focal settings of the second subset of ROIs contain at least two different target focal settings, and the first focal setting is computed, in particular by the at least one control unit, by interpolating the at least two different target focal settings of the second subset of ROIs or by averaging the at least two different target focal settings of the second subset of ROIs.

In such implementations, the number of ROIs contained by the second subset of ROIs is equal to or greater than two. Consequently, the total number of the two or more ROIs is at least three.

According to several implementations, in which the target focal settings of the first subset of ROIs contain at least two different target focal settings and the first subset is computed by interpolation as described above, a respective relative priority is provided for each of the two or more ROIs, and the interpolation between the at least two different target focal settings of the first subset of ROIs is carried out depending on the relative priorities of the first subset of ROIs.

According to several implementations, in which the target focal settings of the first subset of ROIs contain at least two different target focal settings and the first subset is computed by averaging as described above, the respective relative priority is provided for each of the two or more ROIs, and the averaging between the at least two different target focal settings of the first subset of ROIs is carried out depending on the relative priorities of the first subset of ROIs.

According to several implementations, in which the target focal settings of the second subset of ROIs contain at least two different target focal settings and the second subset is computed by interpolation as described above, the respective relative priority is provided for each of the two or more ROIs, and the interpolation between the at least two different target focal settings of the second subset of ROIs is carried out depending on the relative priorities of the second subset of ROIs.

According to several implementations, in which the target focal settings of the second subset of ROIs contain at least two different target focal settings and the second subset is computed by averaging as described above, the respective relative priority is provided for each of the two or more ROIs, and the averaging between the at least two different target focal settings of the second subset of ROIs is carried out depending on the relative priorities of the second subset of ROIs.

In particular, some ROIs of the first or second subset of ROIs can be given a higher priority than other ROIs. When computing the first focal setting and/or the second focal setting accordingly, the ROIs with higher priorities and their respective target focal settings may be given a bigger weight in the interpolation or averaging. Consequently, the specific requirements of functions which use an ROI with a higher priority may be achieved better.

According to several implementations, the target focal settings of the first subset of ROIs contain at least two different target focal settings, and the first focal setting is computed, in particular by the at least one control unit, by carrying out an optimization. The optimization is carried out depending on the at least two different target focal settings of the first subset of ROIs, wherein the first focal setting is given by an optimal solution of a predefined first objective function.

In particular, the objective function and/or boundary conditions for the optimization may depend on the at least two different target focal settings of the first subset of ROIs. For example, the optimization may aim to minimize a deviation of the first focal setting from the respective target focal settings summed up for all of the ROIs of the first subset of ROIs. However, also here an appropriate weighting may be considered, for example, depending on relative priorities of the target focal settings. A boundary condition could, for example, be that a certain predefined maximum deviation should not be exceeded for any of the target focal settings with respect to the first focal setting. However, also more complex or different types of optimizations may be used.

Also in such implementations, the number of ROIs contained in the first subset of ROIs is equal to or greater than two, such that the total number of the two or more ROIs is at least three.

Compared to the interpolation or averaging, using the optimization to determine the first focal setting may reduce the unwanted effects of considering a common first focal setting for all ROIs of the first subset of ROIs even further.

According to several implementations, the target focal settings of the second subset of ROIs contain at least two different target focal settings, and the second focal setting is computed, in particular by the at least one control unit, by carrying out a further optimization. The further optimization is carried out depending on the at least two different target focal settings of the second subset of ROIs, wherein the second focal setting is given by an optimal solution of a predefined second objective function.

The explanations regarding the optimization to compute the second focal setting carry over analogously.

According to several implementations, wherein the first focal setting is computed by carrying out the optimization as described, for each of the two or more ROIs a respective relative priority is provided, and the optimization is carried out depending on the relative priorities of the first subset of ROIs.

According to several implementations, wherein the second focal setting is computed by carrying out the further optimization as described, for each of the two or more ROIs the respective relative priority is provided, and the further optimization is carried out depending on the relative priorities of the second subset of ROIs.

In particular, the first objective function and/or the second objective function may depend on the relative priorities and/or the boundary conditions.

According to several implementations, the sensor array of the imager is exposed according to a global shutter mode or according to a rolling shutter mode for capturing the first image and/or for capturing the second image.

In digital cameras and, in particular, in automotive cameras, it is known to use electronic shutters rather than mechanical shutters, as used, for example, in classical DSLR cameras. In case of an electronic shutter, the sensor pixels of the sensor array are electronically controlled such that only photoelectrons that are generated during a defined exposure period, also denoted as integration period, by light hitting the respective sensor pixel contribute to a cumulated charge or cumulated voltage being read out to determine the corresponding pixel value of the raw image. There is no mechanical component, however, ensuring that light will hit the respective sensor pixels only during the exposure time as in case of a mechanical shutter.

On the one hand, an electronic shutter can be implemented as a global shutter. In this case, all sensor pixels of the sensor array are exposed at the same time. In other words, the exposure period starts at the same time and ends at the same time for all pixels of the sensor array. On the other hand, the electronic shutter can be implemented as a rolling shutter, wherein the sensor pixels of the sensor array are grouped into a plurality of rows, also denoted as lines, and the exposure time starts and ends at the same time for all sensor pixels of a given row. The exposure period for different rows, however, starts and ends at different times. For example, there may be a predefined temporal offset between the start of exposure for neighboring rows. Consequently, the exposure period starts for one row after the other for each of the plurality of rows, and the exposure of the whole sensor array is completed when the last row has been exposed. For completeness, it is noted that both, a rolling shutter and a global shutter, may also be implemented mechanically.

Advantages of rolling shutters compared to global shutters comprise a simplified pixel architecture of the imager, since the rolling shutter principle requires less intermediate buffering of data and less complex read-out electronics. Furthermore, the dissipated heat and the electronic noise are reduced, and also thermal noise can be less than for a global shutter. On the other hand, global shutters have advantages when capturing images of moving objects. Typically, cameras operating according to a global shutter mode may operate at higher frame rates, have a particularly high resolution, and/or achieve a high image quality even for short exposure times.

According to several implementations, for capturing the first image, the sensor array of the imager is exposed according to the global shutter mode during a first exposure period within the first frame period. For capturing the second image, the sensor array is exposed according to the global shutter mode during a second exposure period within the second frame period. The at least one focal parameter of the camera is adjusted to change the first focal setting to the second focal setting or, in other words, change the focal setting of the camera from the first focal setting to the second focal setting, during a focal adjustment period, which lies between, in particular completely lies between, the first exposure period and the second exposure period.

In other words, the focal adjustment period starts when or after the first exposure period ends and ends before or when the second exposure period starts. Consequently, it is avoided that any focal adjustment is carried out while the sensor array is being exposed which could lead to unwanted effects in the images and reduce the image quality.

According to several implementations, for capturing the first image, the sensor array of the imager is exposed according to the rolling shutter mode during a first exposure period within the first frame period and, for capturing the second image, the sensor array is exposed according to the rolling shutter mode during the second exposure period within the second frame period.

The at least one focal parameter of the camera is adjusted to change the first focal setting to the second focal setting or, in other words to change the focal setting of the camera from the first focal setting to the second focal setting, during a focal adjustment period, which overlaps with the first exposure period and/or with the second exposure period.

Since, according to the rolling shutter mode, the sensor pixels of the sensor array are not exposed all at the same time or, in other words, a part of the sensor array may already have been completely exposed while another part has not yet been completely exposed, it is possible to adjust the at least one focal parameter during the focal adjustment period without negatively affecting the mapping of the first and/or second subset of ROIs, even though the focal adjustment period overlaps with the first and/or second exposure period.

According to several implementations, in which the rolling shutter mode is used for capturing the first and the second image, a plurality of rows of the sensor array is exposed according to the rolling shutter mode for capturing the first image. At least one first array on the sensor array, which corresponds to the first subset of ROIs, is determined, in particular by the at least one control unit. A first subset of the plurality of rows is determined, wherein the first subset of rows contains the at least one first area. The focal adjustment period starts when or after all rows of the first subset of rows have been exposed during the first exposure period and, for example, before all rows of the plurality of rows have been exposed during the first exposure period.

The sensor array is, in particular, a rectangular array of sensor pixels arranged in pixel rows and pixel columns, such that each sensor pixel is uniquely specified by a pixel row and a pixel column. Each of the rows associated to the rolling shutter mode or, in other words, the rows of the plurality of rows, may correspond to one or more neighboring or consecutive pixel rows or pixel columns. For example, a row of the plurality of rows may contain tens, hundreds or even thousands of pixel rows or pixel columns.

In the following, it is assumed that a row of the plurality of rows corresponds to a number of pixel rows rather than pixel columns. However, all explanations carry over analogously to the case that a row contains a number of pixel columns instead of pixel rows.

The length of the individual rows of the plurality of rows is equal to the length of the individual pixel rows. In other words, each row comprises pixels for each of the pixel columns of the sensor array. Consequently, the first subset or rows, which contains the at least one first area covers in general an area that is greater than the at least one first area, since the latter does not necessarily contain sensor pixels of all pixel columns.

The first subset of rows may for example comprise only such rows of the plurality of rows, which do overlap with the at least one first area. In other words, the first subset or rows may be considered as a minimum subset of the plurality of rows, which contains the at least one first area.

As indicated above, each of the two or more ROIs can be mapped to a specific two-dimensional part of the surface of the sensor array. Consequently, each of the first subset of ROIs is mapped to one of the at least one first area.

The rolling shutter is preferably an electronic shutter. However, in principle, the respective implementations of the method may also be applied in case of a mechanical shutter. If not mentioned otherwise, it is assumed here and in the following that the rolling shutter is an electronic shutter. The respective implementations of the method are based on the assumption that the exposure of the first subset of rows is completed before the exposure of all rows of the plurality of rows is completed. The focal adjustment period starts between those two time instances.

In other words, assuming that the plurality of rows comprises a number of N consecutive rows labeled by 1, 2, . . . , N, when capturing the first image, the plurality of rows is exposed such that first the exposure period of row 1 starts, and the exposure period of row 2 starts after a predefined offset time or delay time after the exposure time of row 1 has started and so forth. At last, the exposure time of row N starts. In other words, the exposure period of row N is the last to start and the last to end. The first exposure period corresponds to the period between the start of exposure of row 1 and the end of exposure of row N. In particular, the first subset of rows does not contain row N. Said implementations are not directed to the exceptional case that row N is also contained by the first subset of rows. In this case there may be different possibilities how to handle focal adjustment for capturing the second image. For example, the second frame period may be intentionally delayed until the focal parameters have been adjusted or the focal adjustment may be omitted in this case, or it may be accepted that the focal adjustment starts after all rows of the plurality of rows have been exposed.

According to said implementations, it is ensured that the focal adjustment does not happen before all rows of the first subset have been exposed, while it is accepted that the focal adjustment happens while the remaining rows, which are not contained in the first subset of rows, are being exposed. In other words, it is ensured that the mapping of the ROIs of the first subset of ROIs is not affected by the focal adjustment, while it is accepted that image regions outside of the ROIs of the first subset of ROIs are affected by the focal adjustment. In other words, subsequent vehicle functions making use of the first image can use the part of the first image, which corresponds to the first subset of ROIs without any quality reductions due to the focal adjustment, while quality reductions outside of the first subset of ROIs are accepted and are, for example, not relevant for the corresponding vehicle function.

According to several implementations, for capturing the second image, the plurality of rows of the sensor array is exposed according to the rolling shutter mode, and at least one second area of the sensor array is determined, which corresponds to the second subset of ROIs. A second subset of the plurality of rows is determined, wherein the second subset of rows contains the at least one sensor array. The focal adjustment period ends before any of the second subset of rows is exposed during the second exposure period.

The first subset of rows can be identical to the second subset of rows or different from the second subset of rows. If the at least one second area is identical to the at least one first area, also the second subset of rows is identical to the first subset of rows.

In such implementations, it is ensured that the focal adjustment does not take place while any of the second subset of rows is being exposed during the second exposure period.

For example, the focal adjustment period may end at a time instance when the exposure of the second subset of rows starts. However, in alternative implementations, there may be a time difference between the end of the focal adjustment period and the start of exposure of the second subset of rows in the second exposure period. The time difference may be equal to or greater than a predefined non-zero buffer period. The non-zero buffer period may, for example, account for a settling of the focal setting after the adjustment. In this way, variations of the focal setting during the exposure of the second subset of rows in the second exposure period can be avoided.

The respective explanations regarding capturing the first image in the rolling shutter mode carry over analogously to capturing the second image in the rolling shutter mode.

According to several implementations, adjusting the at least one focal parameter comprises changing a distance between the sensor array, in particular the image plane, and the lens unit of the camera.

The lens unit comprises one or more lenses. For changing the distance between the sensor array and the lens unit, the lens unit and the sensor array may be moved relative to each other. In particular, the lens unit may remain stationary while the sensor array is moved, for example, the whole imager is moved, or the imager and the sensor array may remain stationary while the lens unit, in particular the complete unit, with all of the one or more lenses, is moved.

By changing the distance between the sensor array and the lens unit, in particular mechanically, the distance between the object-side principal plane of the lens unit and the image plane is changed accordingly.

According to several implementations, adjusting the at least one focal parameter comprises changing a focal length of the lens unit of the camera.

Also by changing the focal length, for example by changing optical properties of the one or more lenses or their relative position with respect to each other or their shape, the position of the object-side principal plane with respect to the image plane is changed.

According to a further aspect of the invention, a method for guiding a vehicle, in particular a motor vehicle, at least in part automatically is provided. Therein, the vehicle comprises an automotive camera and a method according to the invention for focal adjustment of the automotive camera is carried out. The vehicle is guided at least in part automatically depending on the first image and/or the second image.

For guiding the vehicle at least in part automatically, one or more computer vision functions may be carried out depending on the first and/or second image. A further control unit of the vehicle may generate at least one control signal for guiding the vehicle at least in part automatically depending on a result of the one or more computer vision functions. The one or more control signals may, for example, be provided to one or more actuators of the vehicles, which affect a lateral and/or longitudinal control of the vehicle depending on the one or more control signals in order to guide the vehicle at least in part automatically.

Alternatively or in addition, one or more human vision functions may be carried out depending on the first and/or second image. To this end, the first and/or second image may be displayed or first processed and then displayed on a display device of the vehicle to assist a driver of the vehicle for guiding the vehicle.

For use cases or use situations which may arise in the method and which are not explicitly described here, it may be provided that, in accordance with the method, an error message and/or a prompt for user feedback is output and/or a default setting and/or predetermined initial state is set.

According to a further aspect of the invention, an automotive camera is provided. The automotive camera comprises an imager, a focal adjustment arrangement and at least one control unit. The at least one control unit is configured to receive, for each of two or more predefined ROIs within a field of view of the camera, a corresponding target focal setting for the camera. The at least one control unit is configured to determine a first focal setting for a first subset of the two or more predefined ROIs depending on the respective target focal settings of the ROIs of the first subset of ROIs. The at least one control unit is configured to control the imager to capture a first image during a first frame period, wherein the first focal setting is used at least during a part of the first frame period. The at least one control unit is configured to determine a second focal setting for a second subset of the two or more predefined ROIs depending on the respective target focal settings of the ROIs of the second subset of ROIs. The at least one control unit is configured to control the focal adjustment arrangement to change the first focal setting to the second focal setting and to control the imager to capture a second image during a second frame period after the first frame period, wherein the second focal setting is used at least during a part of the second frame period.

The at least one control unit may, for example, receive the target focal settings for the two or more ROIs from a storage device, which may be part of the camera or the at least one control unit.

A control unit of the at least one control unit may also be denoted as a respective computing unit. The at least one control unit may partially or fully be comprised by the imager or may be implemented separately from the imager.

A computing unit may in particular be understood as a data processing device, which comprises processing circuitry. The computing unit can therefore in particular process data to perform computing operations. This may also include operations to perform indexed accesses to a data structure, for example a look-up table, LUT.

In particular, the computing unit may include one or more computers, one or more microcontrollers, and/or one or more integrated circuits, for example, one or more application-specific integrated circuits, ASIC, one or more field-programmable gate arrays, FPGA, and/or one or more systems on a chip, SoC. The computing unit may also include one or more processors, for example one or more microprocessors, one or more central processing units, CPU, one or more graphics processing units, GPU, and/or one or more signal processors, in particular one or more digital signal processors, DSP. The computing unit may also include a physical or a virtual cluster of computers or other of said units.

In various embodiments, the computing unit includes one or more hardware and/or software interfaces and/or one or more memory units.

A memory unit may be implemented as a volatile data memory, for example a dynamic random access memory, DRAM, or a static random access memory, SRAM, or as a non-volatile data memory, for example a read-only memory, ROM, a programmable read-only memory, PROM, an erasable programmable read-only memory, EPROM, an electrically erasable programmable read-only memory, EEPROM, a flash memory or flash EEPROM, a ferroelectric random access memory, FRAM, a magnetoresistive random access memory, MRAM, or a phase-change random access memory, PCRAM.

In order to control the adjustment arrangement, the at least one control unit may generate at least one focal control signal and provide it to the focal adjustment arrangement accordingly.

According to several implementations of the automotive camera according to the invention, the focal adjustment arrangement is configured to move the sensor array relative to a lens unit of the camera to adjust the at least one focal parameter.

According to several implementations, the focal adjustment arrangement is configured to change a focal length of a lens unit of the camera to adjust the at least one focal parameter.

Further implementations of the automotive camera according to the invention follow directly from the various embodiments of the method according to the invention and vice versa. In particular, individual features and corresponding explanations as well as advantages relating to the various implementations of the method according to the invention can be transferred analogously to corresponding implementations of the automotive camera according to the invention. In particular, the automotive camera according to the invention is designed or programmed to carry out the method according to the invention. In particular, the automotive camera according to the invention carries out the method according to the invention.

According to a further aspect of the invention, an electronic vehicle guidance system for a vehicle is provided. The electronic vehicle guidance system comprises an automotive camera according to the invention and a further control unit. The further control unit is configured to generate one or more control signals for guiding the vehicle at least in part automatically depending on the first image and/or the second image and/or to carry out a method for guiding a vehicle at least in part automatically according to the invention.

An electronic vehicle guidance system may be understood as an electronic system, configured to guide a vehicle in a fully automated or a fully autonomous manner and, in particular, without a manual intervention or control by a driver or user of the vehicle being necessary. The vehicle carries out all required functions, such as steering maneuvers, deceleration maneuvers and/or acceleration maneuvers as well as monitoring and recording the road traffic and corresponding reactions automatically. In particular, the electronic vehicle guidance system may implement a fully automatic or fully autonomous driving mode according to level 5 of the SAE J3016 classification. An electronic vehicle guidance system may also be implemented as an advanced driver assistance system, ADAS, assisting a driver for partially automatic or partially autonomous driving. In particular, the electronic vehicle guidance system may implement a partly automatic or partly autonomous driving mode according to levels 1 to 4 of the SAE J3016 classification. Here and in the following, SAE J3016 refers to the respective standard dated June 2018.

Guiding the vehicle at least in part automatically may therefore comprise guiding the vehicle according to a fully automatic or fully autonomous driving mode according to level 5 of the SAE J3016 classification. Guiding the vehicle at least in part automatically may also comprise guiding the vehicle according to a partly automatic or partly autonomous driving mode according to levels 1 to 4 of the SAE J3016 classification.

According to a further aspect of the invention, a first computer program is provided, which comprises first instructions. When the first instructions are executed by an automotive camera according to the invention, for example by the at least one control unit, the first instructions cause the automotive camera to carry out a method for focal adjustment according to the invention.

According to a further aspect of the invention, a second computer program comprising second instructions is provided. When the second instructions are carried out by an electronic vehicle guidance system according to the invention, in particular by the at least one control unit of the automotive camera and/or the further control unit of the electronic vehicle guidance system, the second instructions cause the electronic vehicle guidance system to carry out a method for guiding a vehicle at least in part automatically according to the invention.

The first and/or second instructions may be provided as program code. The program code may for example be provided as binary code or assembler and/or as source code of a programming language, for example C, and/or as program script, for example Python.

According to a further aspect of the invention, a computer-readable storage device is provided. The computer-readable storage device stores a first computer program and/or a second computer program according to the invention.

The first computer program, the second computer program and the computer-readable storage device may be denoted as respective computer program products comprising the first and/or second instructions, respectively.

Further features of the invention are apparent from the claims, the figures and the figure description. The features and combinations of features mentioned above in the description as well as the features and combinations of features mentioned below in the description of figures and/or shown in the figures may be comprised by the invention not only in the respective combination stated, but also in other combinations. In particular, embodiments and combinations of features, which do not have all the features of an originally formulated claim, may also be comprised by the invention. Moreover, embodiments and combinations of features which go beyond or deviate from the combinations of features set forth in the recitations of the claims may be comprised by the invention.

In the following, the invention will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

In the figures:

FIG. 7 shows schematically a use case for applying a method for focal adjustment according to the invention in terms of a flow diagram;

FIG. 8 shows schematically a further use case for applying a method for focal adjustment according to the invention in terms of a flow diagram;

FIG. 9 shows schematically a further use case for applying a method for focal adjustment according to the invention in terms of a flow diagram; and FIG. 10 shows schematically a further use case for applying a method for focal adjustment according to the invention in terms of a flow diagram.

Figure 1:
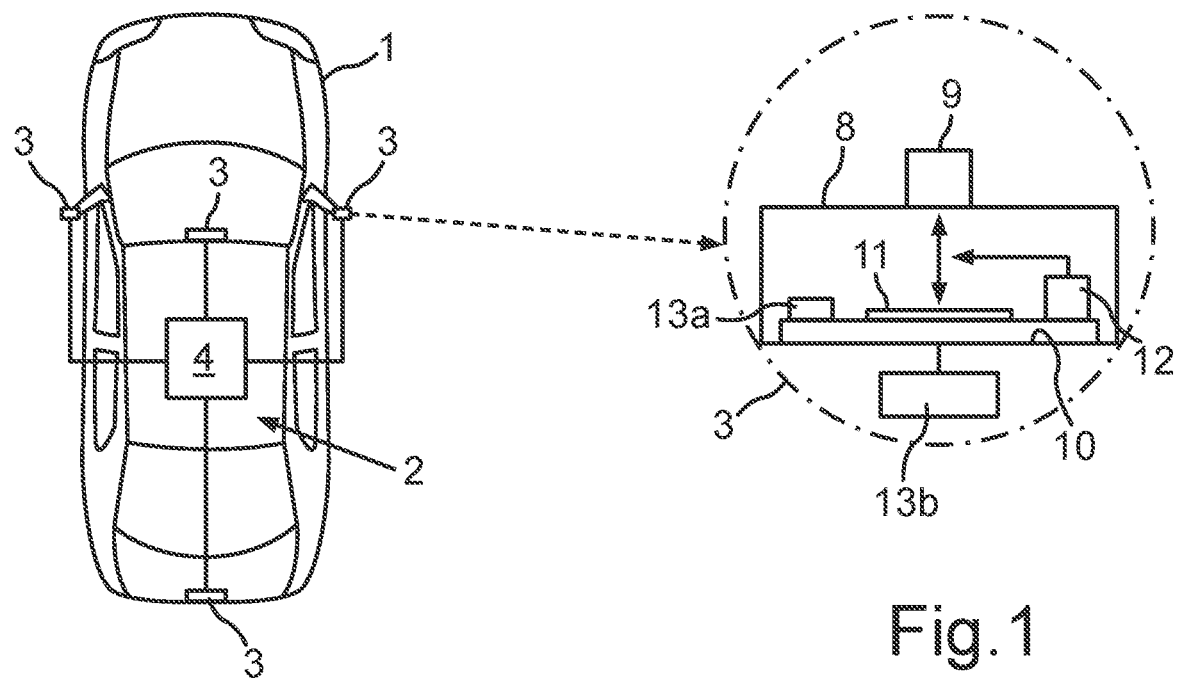
FIG. 1 shows schematically a vehicle with an exemplary implementation of an electronic vehicle guidance system according to the invention comprising an exemplary implementation of an automotive camera according to the invention.

FIG. 1 shows schematically a vehicle 1, which comprises an electronic vehicle guidance system 2 according to the invention. The vehicle guidance system 2 comprises one or more cameras implemented as an automotive camera 3 according to an exemplary implementation of the invention.

The automotive camera 3 is shown schematically as a block diagram in the inset of FIG. 1.

The automotive camera 3 comprises an imager 10, which is for example arranged inside a housing 8 of the camera 3. The automotive camera 3 also comprises a lens unit 9 containing one or more lenses (not shown). Furthermore, a sensor array 11 of the imager is arranged with respect to the lens unit 9 such that light passing through the lens unit 9 may hit a surface of the sensor array 11. The camera 3 comprises one or more control units 13a, 13b. The one or more control units 13a, 13b can be part of the imager 10 as shown for a control unit 13a in FIG. 1 or can be implemented in addition to the imager 10, as shown for a control unit 13b in FIG. 1.

Furthermore, the automotive camera 3 comprises a focal adjustment arrangement 12, which is controllable by the at least one control unit 13a, 13b to change at least one focal parameter or adjust at least one focal parameter of the camera 3. To this end, the focal adjustment arrangement may be controlled by the at least one control unit 13a, 13b to change a distance between the surface of the sensor array 11, which corresponds to an image plane of the camera, to an object-side principal plane of the lens unit 9. This may be achieved by moving the position of the sensor array 11 with respect to the position of the lens unit 9. For example, the imager 10 and the sensor array 11 may remain fixed while the position of the lens unit 9 may be changed by the focal adjustment arrangement or vice versa. Alternatively or in addition, the focal adjustment arrangement 12 may change optical properties, for example the focal length, of the lens unit electronically.

The electronic vehicle guidance system 2 may comprise a further control unit 4, which may for example be implemented as an electronic control unit, ECU, and is connected to the camera 3. The camera 3 is configured to generate a stream of camera images comprising at least a first image and a second image and provide the stream or a preprocessed version of the stream to the further control unit 4. The further control unit 4 may then generate one or more control signals for guiding the vehicle 1 at least in part automatically depending on the stream of camera images and provide the one or more control signals to respective actuators (not shown) of the vehicle, which affect a longitudinal and/or lateral control of the vehicle 1 depending on the one or more control signals.

The camera 3 is able to carry out a method for focal adjustment of an automotive camera according to the invention. Details of such method are explained in the following with reference to figures FIG. 2 to FIG. 6.

The at least one control unit 13a, 13b is configured to receive, for example from a storage device (not shown) of the camera, for each of two or more predefined ROIs 6a, 6b, 6c, 7a, 7b, 7c within a field of view of the camera 3, a corresponding target focal setting for the camera 3.

Figure 2:
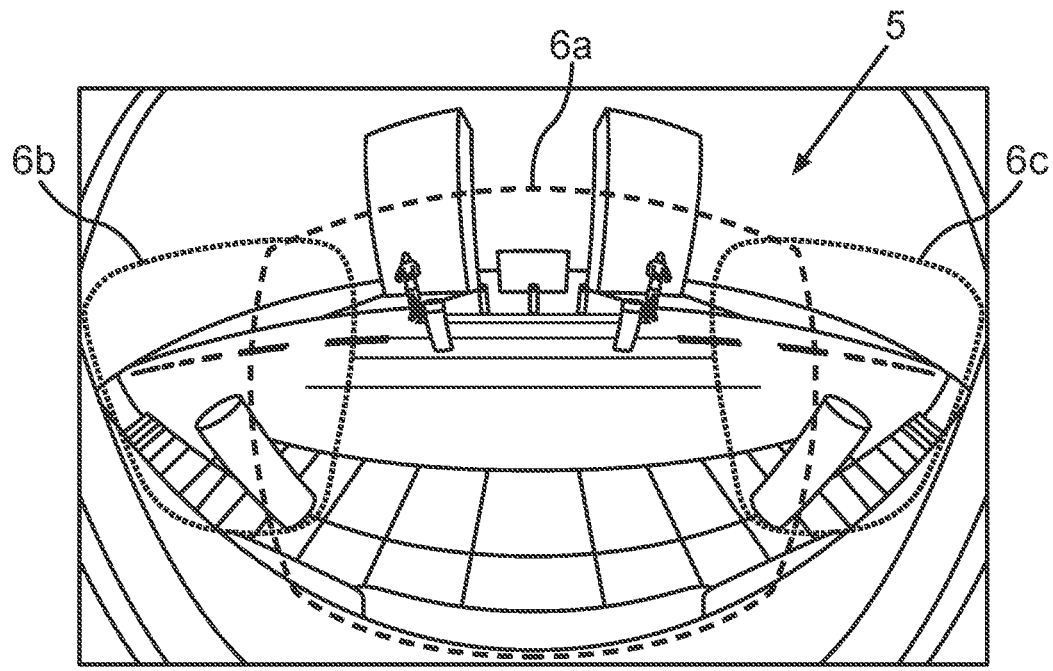
FIG. 2 shows schematically regions of interest in an environment of an automotive camera.

FIG. 2 shows schematically examples for three different regions of interest 6a, 6b, 6c in an environment 5 of the camera 3. The three different regions of interest 6a, 6b, 6c may be defined by different sizes and/or horizontal angles from the camera perspective. The regions of interest 6a, 6b, 6c may for example correspond to three-dimensional volumes in the environment 5, which are cuboid or approximately cuboid volumes. In case the camera 3 is a non-rectilinear camera, such as a fisheye camera, the straight lines or plane faces delimiting the cuboid volume are distorted as indicated in FIG. 2.

The different regions of interest 6a, 6b, 6c may for example be relevant for different functions of the electronic vehicle guidance system 2. The center region of interest 6a may for example be used for assisting a driver at backwards driving of the vehicle 1 by displaying a corresponding part of the images captured by the camera 3 on a display device (not shown) of the vehicle 1. On the other hand, the lateral regions of interest 6b, 6c may for example be used by a computer vision function, such as an object detection function, which is targeting at detecting other vehicles for example at a further distance from the vehicle 1. Consequently, it may be desirable to have different focal settings for the different ROIs 6a, 6b, 6c. The invention allows to use different frames of the image stream with different focal settings to toggle between the optimum settings for different ROIs for example. Each ROI 6a, 6b, 6c may be directly mapped to a corresponding area, which is a part of the surface of the sensor array 11.

Figure 3:
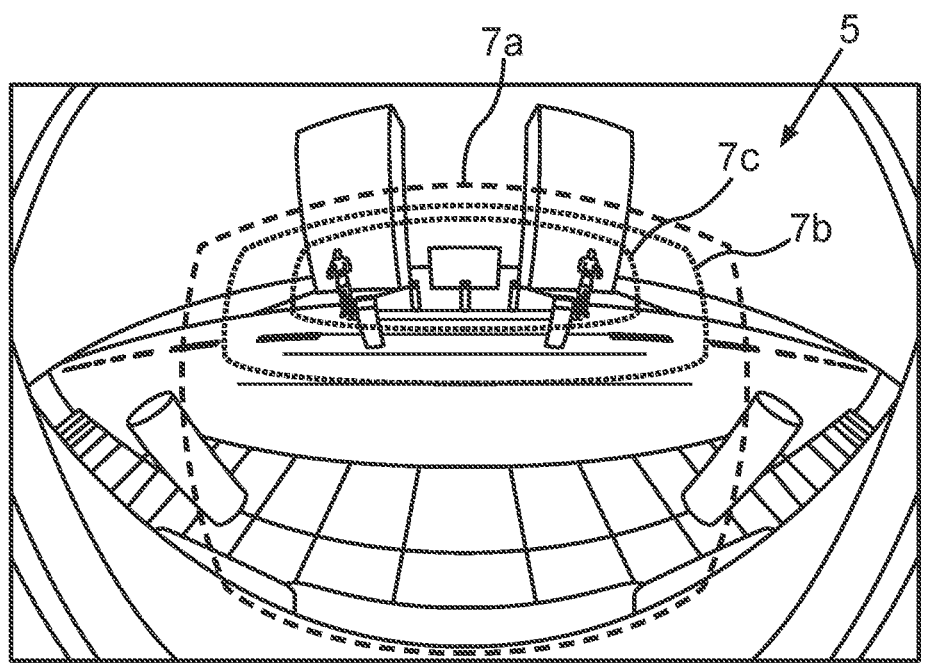
FIG. 3 shows schematically further regions of interest in an environment of an automotive camera.

FIG. 3 shows further examples of different ROIs 7a, 7b, 7c in the environment 5 of the camera 3. In this example, the largest ROI 7a contains a smaller ROI 7b, which again contains an even smaller ROI 7c. For these ROIs 7a, 7b, 7c also different focal settings according to different expected distances of relevant objects in the environment 5 from the camera 3 may be desirable.

In the course of a method according to the invention, the at least one control unit 13a, 13b determines a first focal setting for a first subset of the two or more ROIs 6a, 6b, 6c, 7a, 7b, 7c depending on the respective target focal settings of the ROIs of the first subset of ROIs. The at least one control unit 13a, 13b controls the imager 10 to capture a first image during a first frame period F1, wherein the first focal setting is used at least during a part of the first frame period F1. The at least one control unit 13a, 13b determines a second focal setting for a second subset of the two or more predefined ROIs 6a, 6b, 6c, 7a, 7b, 7c depending on the respective target focal settings of the ROIs of the second subset of ROIs. The at least one control unit 13a, 13b controls the focal adjustment arrangement 12 to change the first focal setting to the second focal setting and controls the imager 10 to capture a second image during a second frame period $F_2$ after the first frame period $F_1$, wherein the second focal setting is used at least during a part of the second frame period $F_2$. To this end, the focal adjustment arrangement 12 adjusts at least one focal parameter during a focal adjustment period $T_a$.

The imager 10 may for example be operated in a global shutter mode. The sensor array 11 can then be exposed accordingly as a whole during a first exposure period within the first frame period $F_1$ to capture the first image and again during a second exposure period within the second frame period $F_2$ to capture the second image. Then, the focal adjustment period $T_a$ lies between the first exposure period and the second exposure period.

Figure 4:
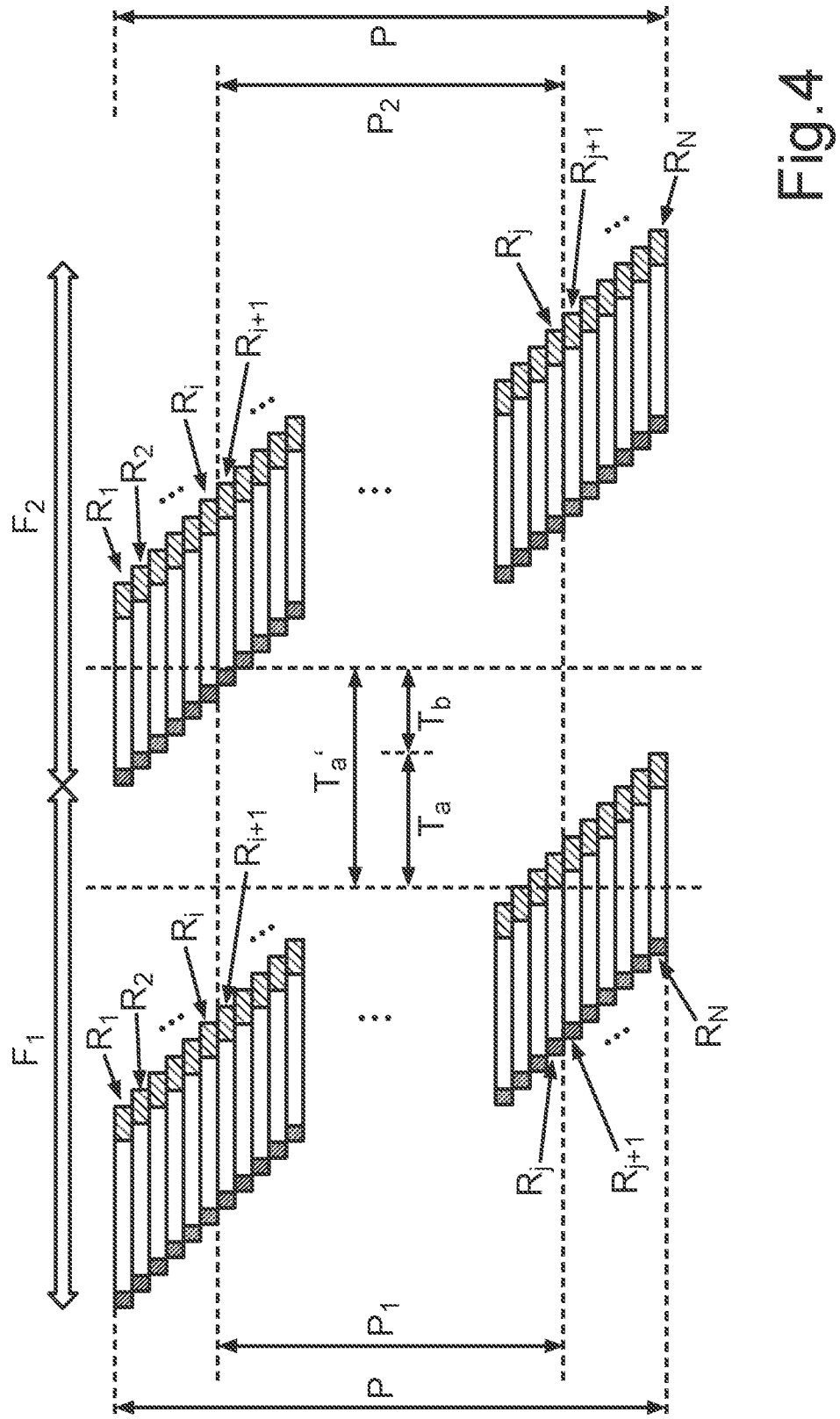
FIG. 4 shows schematically the exposure of a plurality of rows according to a rolling shutter mode in two consecutive frame periods according to an exemplary implementation of a method for focal adjustment according to the invention.
Figure 5:
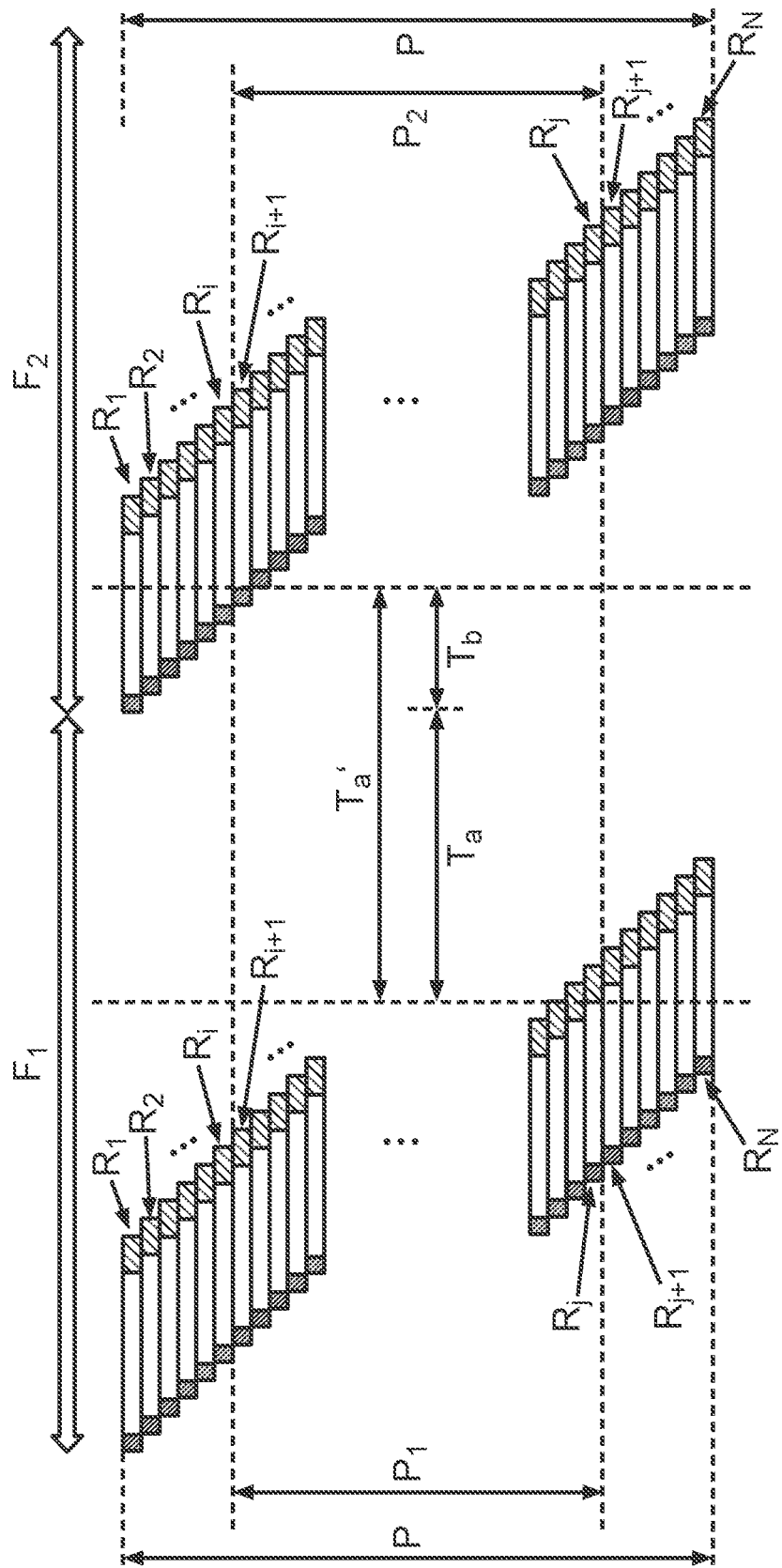
FIG. 5 shows schematically the exposure of a plurality of rows according to a rolling shutter mode in two consecutive frame periods according to a further exemplary implementation of a method for focal adjustment according to the invention.
Figure 6:
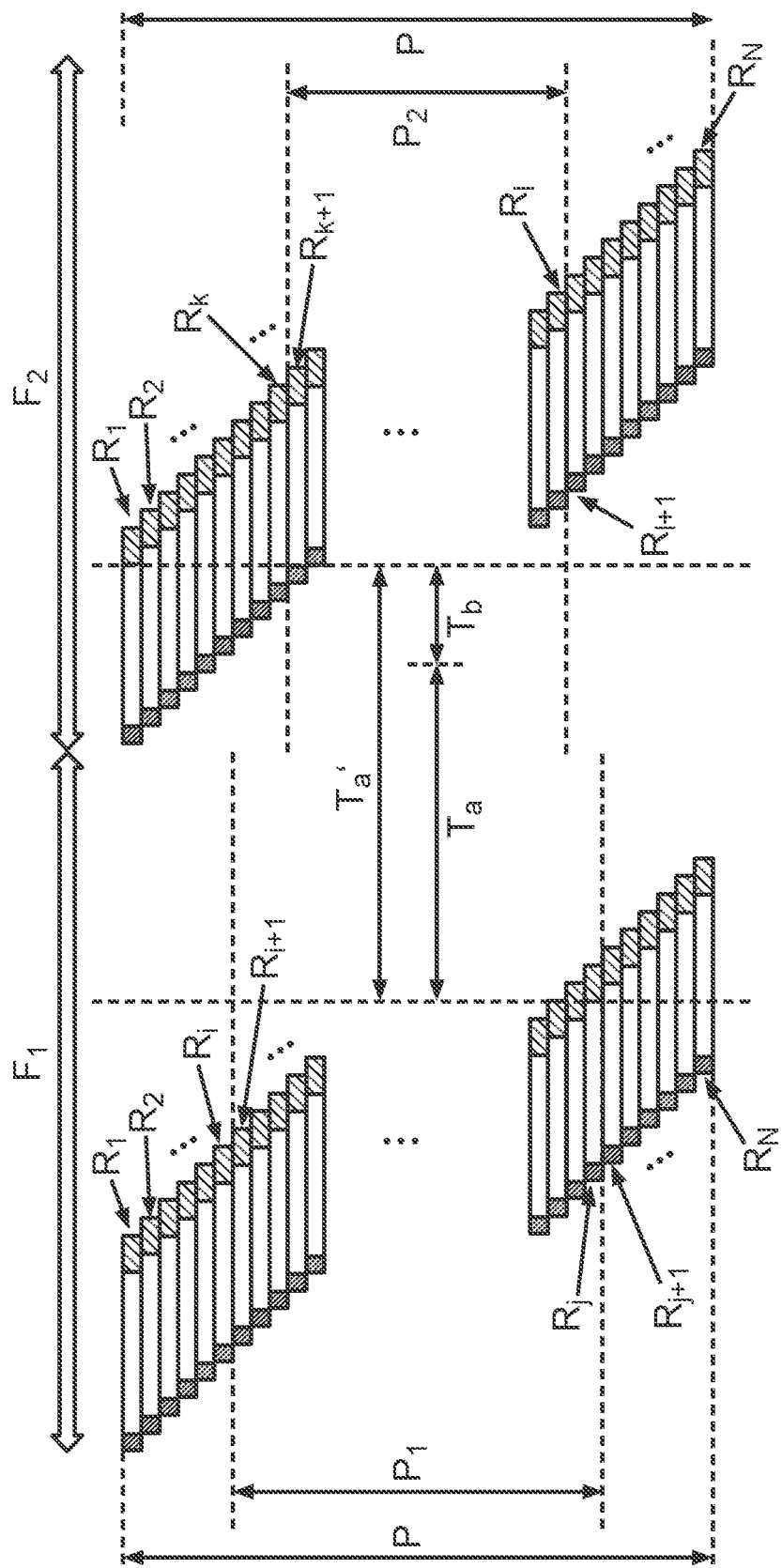
FIG. 6 shows schematically the exposure of a plurality of rows according to a rolling shutter mode in two consecutive frame periods according to a further exemplary implementation of a method for focal adjustment according to the invention.

Alternatively, the imager 10 may be operated in a rolling shutter mode, as depicted schematically in FIG. 4, FIG. 5 and FIG. 6. Therein, a plurality of rows P of the sensor array 11 is exposed as commonly known for rolling electronic shutters. For each of the rows $R_1, R_2, \ldots, R_i, R_{i+1}, \ldots, R_j, R_{j+1}, \ldots, R_N$, a reset period, during which the corresponding buffer is cleared, is followed by an exposure period or, in other words, integration period, and after the exposure period is finished, a respective read out period follows, wherein all pixels of the respective row are read out. The reset periods and the read out periods are represented by blocks with different shadings, while the exposure periods are represented by blank blocks. As known for the rolling shutter principle, the individual exposure periods of neighboring rows are offset with respect to each other by a predefined offset time. In a second frame period $F_2$ after the first frame period $F_1$, the at least one control unit 13a, 13b controls the imager 10 to capture a second image in the same way by exposing the plurality of rows P according to the rolling shutter mode.

The at least one control unit 13a, 13b determines at least one first area on the sensor array 11, which corresponds to the first subset of ROIs, and determines a first subset $P_1$ of the plurality of rows P, which contains the at least one first area. In the example of FIG. 4, the rows $R_1$ to $R_i$ are not contained by the first subset $P_1$ as well as the rows $R_{j+1}$ to $R_N$. The first subset $P_1$ comprises the rows $R_{i+1}$ to $R_j$. Analogously, the at least one control unit 13a, 13b may determine a second subset $P_2$ of the plurality of rows P, which contains at least one second area, wherein the at least one second area corresponds to the second subset of ROIs. The at least one first area may be identical to or different from the at least one second area on the sensor array 11. In case the at least one first area is identical to the at least one second area, the first subset of rows $P_1$ is identical to the second subset of rows $P_2$, as shown schematically in FIG. 4. On the other hand, if the at least one first area is different from the at least one second area, the first subset of rows $P_1$ may be different from the second subset of rows $P_2$, as indicated schematically in FIG. 6. In this case, the first subset of rows $P_1$ comprises the rows $R_{i+1}$ to $R_j$ as described with respect to FIG. 4 and the second subset of rows $P_2$ comprises the rows $R_{k+1}$ to $R_l$, wherein k≠i and/or l≠j.

In the example of FIG. 5 the first subset of rows $P_1$ is identical to the second subset of rows $P_2$ as explained for FIG. 4. In the example of FIG. 4, however, the exposure of the first row $R_1$ in the second frame period $F_2$ begins immediately after the exposure of the last row $R_N$ in the first frame period $F_1$ has ended. In the examples of FIG. 5 and FIG. 6, on the other hand, there is an intermediate time period between the end of the exposure of the last row $R_N$ in the first frame period $F_1$ and the beginning of the exposure of the first row $R_1$ in the second frame period $F_2$.

The at least one control unit 13a, 13b determines the focal adjustment period $T_a$ depending on the first subset $P_1$ and, in particular, depending on the second subset $P_2$ and controls the focal adjustment arrangement 12 to adjust the at least one focal parameter of the camera 3 during the focal adjustment period $T_a$ to change the focal setting of the camera 3 from the first focal setting to the second focal setting. Therein, the focal adjustment period $T_a$ starts when or after all rows of the first subset of rows $P_1$ have been exposed in the first frame period $F_1$, in the present example after the last row $R_j$ of the first subset of rows $P_1$ has been exposed. Furthermore, the focal adjustment period $T_a$ starts before all rows of the plurality of rows P have been exposed during the first frame period $F_1$ or, in other words, in the present example before the last row $R_N$ of the plurality of rows P has been exposed. Furthermore, the focal adjustment period $T_a$ ends before any of the rows of the second subset of rows $P_2$ has started to be exposed during the second frame period $F_2$ or, in the present example of FIG. 4, before the first row $R_i+1$ of the second subset $P_2$ is started being exposed. In the example of FIG. 6, the focal adjustment period $T_a$ accordingly ends before the first row $R_{k+1}$ of the second subset $P_2$ has started to be exposed.

In other words, the maximum time period $T_a'$ available for the focal adjustment is given by the time difference between the end of exposure of the last row of the first subset of rows $P_1$, which is in the present example row $R_j$, and the begin of the exposure of the first row of the second subset $P_2$, which is the row $R_{i+1}$ in the examples of FIG. 4 and FIG. 5 and the row $R_{k+1}$ in the example of FIG. 6. However, in several implementations, the focal adjustment period $T_a$ is shorter than the maximum available time period $T_a'$ by a non-zero buffer period $T_b$. The buffer period $T_b$ may correspond to or contain a period provided for settling the at least one focal parameter adjusted by the focal adjustment arrangement 12.

In some implementations, the imager 10 may also provide a vertical and horizontal synchronization signal to the at least one control unit 13a, 13b. The horizontal synchronization signal, also denoted as HSYNC, is output whenever a row has been fully exposed and read out and the vertical synchronization signal, which is also denoted as VSYNC, is output whenever all rows of the plurality of rows P has been exposed.

In FIG. 7 to FIG. 10, different use cases are depicted as schematic flow diagrams, wherein the direction of time is from left to right.

Figures 7, 8:
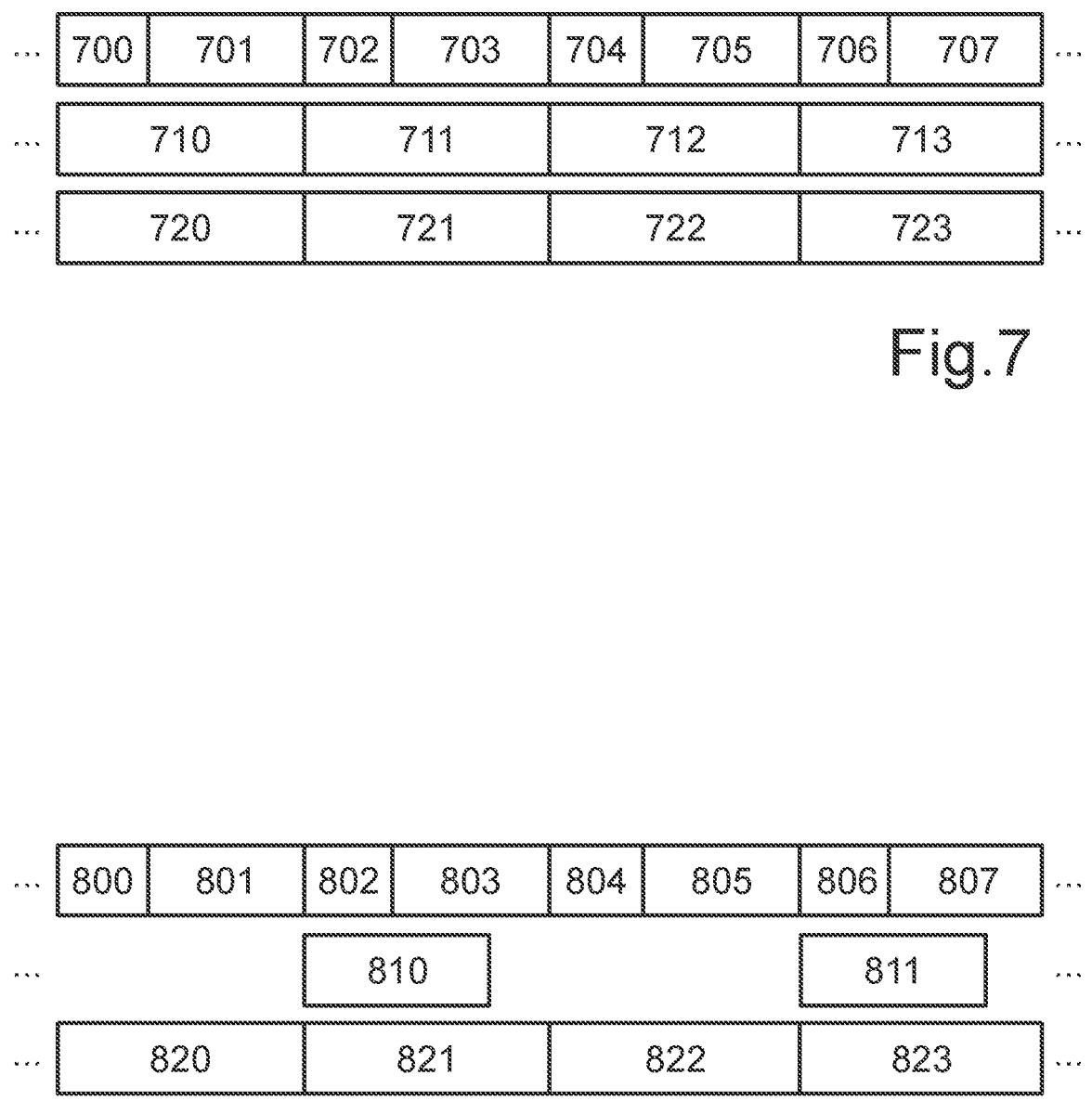

With respect to FIG. 7, it can be assumed that for each of the subsequent frames n, n+1, n+2 and n+3, a respective one of the ROIs 6a, 6b, 6c, 7a, 7b, 7c is relevant and represents the corresponding subset of ROIs. The focal settings are determined and set for each frame as described. During each frame, the imager 10 may capture either the complete image or a crop of the image which includes at least the respective subset of rows required to cover the area on the sensor array corresponding to the respective ROI. The capture is then processed, individually or in combination with other ROI captures.

In FIG. 7, the first line corresponds to the steps of image capturing, the second line corresponds to a human vision function (HV function) and the third line corresponds to a computer vision function (CV function). In block 700, the focal setting determined for frame n is set and the respective raw image is captured in block 701. In block 702, the focal setting determined for frame n+1 is set and the respective raw image is captured in block 703. In block 704, the focal setting determined for frame n+2 is set and the respective raw image is captured in block 705. In block 706, the focal setting determined for frame n+3 is set and the respective raw image is captured in block 707.

In block 710, the output for the HV function is updated based on the capture of a frame n−1 and in block 720, the output for the CV function is updated based on the capture of frame n−1. In block 711, the output for the HV function is updated based on the capture of frame n and in block 721, the output for the CV function is updated based on the capture of frame n−1. In block 712, the output for the HV function is updated based on the capture of frame n+1 and in block 722, the output for the CV function is updated based on the capture of frame n+1. In block 713, the output for the HV function is updated based on the capture of a frame n+2 and in block 723, the output for the CV function is updated based on the capture of frame n+2.

FIG. 8 shows an example for replacing parallel operation of functions with sequential operations, for example replacing two parallel operations with two sequential operations, for example one HV function and one CV function, where each function requires one or more respective ROIs.

In block 800, the focal setting determined for frame n is set and the respective raw image is captured in block 801. In block 802, the focal setting determined for frame n+1 is set and the respective raw image is captured in block 803. In block 804, the focal setting determined for frame n+2 is set and the respective raw image is captured in block 805. In block 806, the focal setting determined for frame n+3 is set and the respective raw image is captured in block 807.

In block 810, the output for the HV function is updated based on the capture of frame n and in block 820, the output for the CV function is updated based on the capture of frame n−1. In block 811, the output for the HV function is updated based on the capture of frame n+2 and in block 821, the output for the CV function is updated based on the capture of frame n+1.

Figure 9:
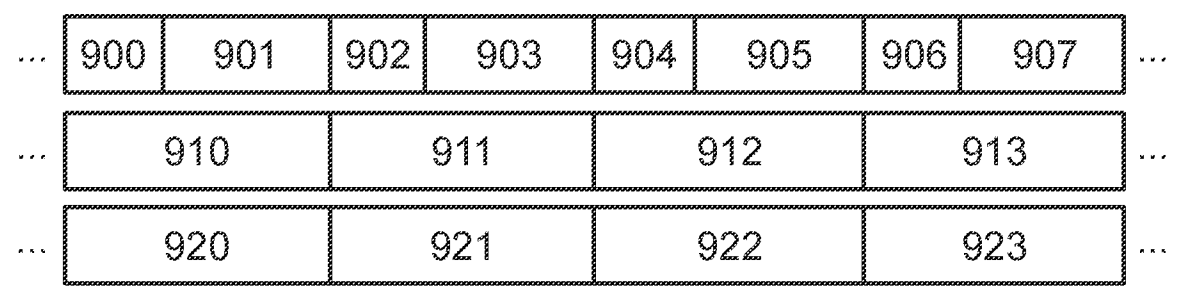

Turning to FIG. 9, in block 900, the focal setting determined for frame n is set and the respective raw image is captured in block 901. In block 902, the focal setting determined for frame n+1 is set and the respective raw image is captured in block 903. In block 904, the focal setting determined for frame n+2 is set and the respective raw image is captured in block 905. In block 906, the focal setting determined for frame n+3 is set and the respective raw image is captured in block 907.

In block 910, the output for the HV function is updated based on the capture of a frame n−1 and in block 920, the output for the CV function is updated based on the capture of frame n−1. In block 911, the output for the HV function is updated based on the capture of frame n and in block 921, the output for the CV function is updated based on the capture of frame n−1. In block 912, the output for the HV function is updated based on the capture of frame n+1 and in block 922, the output for the CV function is updated based on the capture of frame n+1. In block 913, the output for the HV function is updated based on the capture of a frame n+2 and in block 923, the output for the CV function is updated based on the capture of frame n+2.

According to the concept of FIG. 9, a scenario can be considered, wherein for all ROIs in a subset of ROIs for an individual frame, the target focal settings are identical. In this case, the respective target focal settings can be directly set in blocks 900, 902, 904 and 906, respectively.

However, also a scenario can be considered, wherein the target focal settings for different ROIs in a single subset of ROIs for a given frame are not identical. In this case, the focal setting set for the respective frame in blocks 900, 902, 904 and 906 can be obtained by interpolation, averaging or optimization based on the different target focal settings. Therein, all ROIs in the subset of ROIs may have the same relative priority. However, in other scenarios they may have different relative priorities, which can also be considered when determining the respective focal setting to be set in blocks 900, 902, 904 and 906, respectively.

FIG. 10 represents an example of frame-to-frame toggling between two CV functions, CV1 and CV2, each with their own specific ROI or set of ROIs.

In block 1000, the focal setting determined for frame n according to the requirements of CV1 is set and the respective raw image is captured in block 1001. In block 1002, the focal setting determined for frame n+1 according to the requirements of CV2 is set and the respective raw image is captured in block 1003. In block 1004, the focal setting determined for frame n+2 according to the requirements of CV1 is set and the respective raw image is captured in block 1005. In block 1006, the focal setting determined for frame n+x, wherein x>2, according to the requirements of CV2 is set and the respective raw image is captured in block 1007. In block 1008, the focal setting determined for frame n+x+1 according to the requirements of CV2 is set and the respective raw image is captured in block 1009.

In block 1010, the output for CV1 is updated based on the capture of frame n. In block 1020, the output for CV2 is updated based on the capture of a frame n−1. In block 1011, the output for CV1 is updated based on the capture of frame n+x−1. In block 1021, the output for CV2 is updated based on the capture of frame n+1. In block 1022, the output for CV2 is updated based on the capture of frame n+x.

It is noted that, in case a parallel approach with a basic image capture rate of X fps, where all ROIs 6a, 6b, 6c, 7a, 7b, 7c are captured every frame, is replaced with a sequential approach, then the effective capture rate will reduce accordingly, for example to X/2 fps, X/3 fps, X/4 fps, et cetera. One may therefore for example increase the basic frame capture rate, for example to 2X fps, 3X fps, 4X fps, et cetera. It must be ensured then that there is still sufficient time in the frame-to-frame transition to adjust focal parameters for the next frame. One may, however, also accept the reduced frame capture rate.

It is further noted that not all ROIs 6a, 6b, 6c, 7a, 7b, 7c necessarily need to have the same effective capture rate but the effective capture rate may also be chosen depending on their relative priority. For example in a system with five ROIs denoted by ROI1, ROI2, ROI3, ROI4 and ROI5, the following sequence may support multi-rate ROI capturing:

frame n: {ROI1, ROI2, ROI4}
frame n+1: {ROI1, ROI3}
frame n+2: {ROI1, ROI2, ROI5}
frame n+3: {ROI1, ROI3}

If this sequence of four frames is repeated in a cyclic manner, one obtains, assuming X fps as a basic frame rate, the following ROI specific effective capturing rates:

ROI1: X fps
ROI2: X/2 fps
ROI3: X/2 fps
ROI4: X/4 fps
ROI5: X/4 fps

It is noted that in this scheme it is still possible to set the focal parameters according to the relative priority of each of the ROIs. The relative priority of an ROI can also vary from frame-to-frame, depending on other ROIs active in the same frame. In the example above, the relative priorities may for example be as follows:

frame n: priority of ROI4>priority of ROI1>priority of ROI2
frame n+1: priority of ROI3>priority of ROI1
frame n+2: priority of ROI1>priority of ROI2>priority of ROI5
frame n+3: priority of ROI3>priority of ROI1

The focusing mechanism can support a high operational duty-cycle without degradation over operating conditions and lifetime. The fact that the adjustments in focus may be very small is beneficial in this respect.

As described, in particular with respect to the figures, the invention provides an improved concept for focal adjustment of an automotive camera. Therein, the individual requirements of different ROIs can be better met, in particular a reduced degree of compromise has to be made with respect to optimal focal settings for the individual ROIs.

The invention claimed is:

1. A method for focal adjustment of an automotive camera, the method comprising:
for each of two or more predefined regions of interest (ROIs) within a field of view of the camera, providing a corresponding target focal setting for the camera;
determining a first focal setting for a first subset of the two or more ROIs depending on the respective target focal settings of the ROIs of the first subset of ROIs;
capturing a first image during a first frame period by an imager of the camera, wherein the first focal setting is used at least during a part of the first frame period;
determining a second focal setting for a second subset of the two or more predefined ROIs depending on the respective target focal settings of the ROIs of the second subset of ROIs;
changing the first focal setting to the second focal setting and capturing a second image during a second frame period after the first frame period by the imager,
wherein the second focal setting is used at least during a part of the second frame period,
wherein the target focal settings of the first subset of ROIs contain at least two different target focal settings, and the first focal setting is computed by carrying out an optimization depending on the at least two different target focal settings of the first subset of ROIs,
wherein the first focal setting is given by an optimal solution of a predefined first objective function, and
wherein the target focal settings of the second subset of ROIs contain at least two different target focal settings and the second focal setting is computed by carrying out an optimization depending on the at least two different target focal settings of the second subset of ROIs,
wherein the second focal setting is given by an optimal solution of a predefined second objective function.

2. A method for focal adjustment of an automotive camera, the method comprising:
for each of two or more predefined regions of interest (ROIs) within a field of view of the camera, providing a corresponding target focal setting for the camera;
determining a first focal setting for a first subset of the two or more ROIs depending on the respective target focal settings of the ROIs of the first subset of ROIs;
capturing a first image during a first frame period by an imager of the camera,
wherein the first focal setting is used at least during a part of the first frame period;
determining a second focal setting for a second subset of the two or more predefined ROIs depending on the respective target focal settings of the ROIs of the second subset of ROIs; and
changing the first focal setting to the second focal setting and capturing a second image during a second frame period after the first frame period by the imager,
wherein the second focal setting is used at least during a part of the second frame period,
wherein the target focal settings of the first subset of ROIs contain at least two different target focal settings and the first focal setting is computed by interpolating between the at least two different target focal settings of the first subset of ROIs or by averaging the at least two different target focal settings of the first subset of ROIs, and
wherein the target focal settings of the second subset of ROIs contain at least two different target focal settings and the first focal setting is computed by interpolating between the at least two different target focal settings of the second subset of ROIs or by averaging the at least two different target focal settings of the second subset of ROIs; and
providing a respective relative priority for each of the two or more ROIs,
wherein interpolation between the at least two different target focal settings of the first subset of ROIs or averaging of the at least two different target focal settings of the first subset of ROIs is carried out depending on the relative priority of the first subset of ROIs, and wherein interpolation between the at least two different target focal settings of the second subset of ROIs or averaging of the at least two different target focal settings of the second subset of ROIs is carried out depending on the relative priority of the second subset of ROIs.

3. The method according to claim 1, further comprising:
providing a respective relative priority for each of the two or more ROIs,
wherein the optimization depending on the at least two different target focal settings of the first subset of ROIs is carried out depending on the relative priority of the first subset of ROIs; and
wherein the optimization depending on the at least two different target focal settings of the second subset of ROIs is carried out depending on the relative priority of the second subset of ROIs.

4. The method according to claim 1, further comprising:
exposing a sensor array of the imager according to a global shutter mode during a first exposure period within the first frame period to capture the first image;
exposing the sensor array according to the global shutter mode during a second exposure period within the second frame period to capture the second image; and
adjusting at least one focal parameter of the camera to change the first focal setting to the second focal setting during a focal adjustment period,
wherein the focal adjustment period lies between the first exposure period and the second exposure period.

5. The method according to claim 1, further comprising:
exposing a sensor array of the imager according to a rolling shutter mode during a first exposure period within the first frame period for capturing the first image;
exposing the sensor array according to the rolling shutter mode during a second exposure period within the second frame period for capturing the second image; and
adjusting at least one focal parameter of the camera to change the first focal setting to the second focal setting during a focal adjustment period,
wherein the focal adjustment period overlaps with the first exposure period and/or the second exposure period.

6. The method according to claim 5, further comprising:
exposing a plurality of rows of the sensor array according to the rolling shutter mode for capturing the first image;
determining at least one first area on the sensor array, which corresponds to the first subset of ROIs;
determining a first subset of the plurality of rows,
wherein the first subset of rows contains the at least one first area,
wherein the focal adjustment period starts after all rows of the first subset of rows have been exposed during the first exposure period.

7. The method according to claim 6, further comprising:
exposing the plurality of rows of the sensor array according to the rolling shutter mode for capturing the second image;
determining at least one second area on the sensor array, which corresponds to the second subset of ROIs;
determining a second subset of the plurality of rows,
wherein the second subset of rows contains the at least one second area; and
wherein the focal adjustment period ends before any of the second subset of rows is exposed during the second exposure period.13

8. The method according to claim 4,
wherein adjusting the at least one focal parameter comprises changing a distance between the sensor array and a lens unit of the camera and/or changing a focal length of the lens unit.

9. A method for guiding a vehicle at least in part automatically,
wherein a method for focal adjustment of an automotive camera of the vehicle is carried out according to claim 1; and
wherein the vehicle is guided at least in part automatically depending on the first image and the second image.

10. An automotive camera,
comprising an imager, a focal adjustment arrangement and at least one control unit,
wherein the at least one control unit is configured to:
receive, for each of two or more predefined regions of interest (ROIs) within a field of view of the camera, a corresponding target focal setting for the camera;
determine a first focal setting for a first subset of the two or more predefined ROIs depending on the respective target focal settings of the ROIs of the first subset of ROIs;
control the imager to capture a first image during a first frame period, wherein the first focal setting is used at least during a part of the first frame period;
determine a second focal setting for a second subset of the two or more predefined ROIs depending on the respective target focal settings of the ROIs of the second subset of ROIs;
control the focal adjustment arrangement to change the first focal setting to the second focal setting; and
control the imager to capture a second image during a second frame period after the first frame period,
wherein the second focal setting is used at least during a part of the second frame period;
wherein the target focal settings of the first subset of ROIs contain at least two different target focal settings and the first focal setting is computed by carrying out an optimization depending on the at least two different target focal settings of the first subset of ROIs,
wherein the first focal setting is given by an optimal solution of a predefined first objective function; and
wherein the target focal settings of the second subset of ROIs contain at least two different target focal settings and the second focal setting is computed by carrying out an optimization depending on the at least two different target focal settings of the second subset of ROIs,
wherein the second focal setting is given by an optimal solution of a predefined second objective function.

11. An electronic vehicle guidance system for a vehicle, the guidance system comprising: an automotive camera according to claim 10; and a further control unit, which is configured to generate one or more control signals for guiding the vehicle at least in part automatically depending on the first image and/or the second image.

12. A non-transitory computer readable medium containing program instructions for causing a processor to perform the method of claim 1.

* * * * *